(12) United States Patent
Geiler et al.

(10) Patent No.: US 10,956,752 B2
(45) Date of Patent: Mar. 23, 2021

(54) CAMERA FOR MONITORING A MONITORED AREA AND MONITORING DEVICE, AND METHOD FOR MONITORING A MONITORED AREA

(71) Applicant: Robert Bosch GmbH, Stuttgart (DE)

(72) Inventors: Thomas Geiler, Adlingen (DE); Didier Stricker, Kaiserslautern (DE); Oliver Wasenmueller, Kaiserslautern (DE); Jens Ackermann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 16/463,691

(22) PCT Filed: Nov. 6, 2017

(86) PCT No.: PCT/EP2017/078286
§ 371 (c)(1),
(2) Date: May 23, 2019

(87) PCT Pub. No.: WO2018/099689
PCT Pub. Date: Jun. 7, 2018

(65) Prior Publication Data
US 2019/0377958 A1    Dec. 12, 2019

(30) Foreign Application Priority Data
Nov. 30, 2016   (DE) .......................... 102016223859.0

(51) Int. Cl.
*G06K 9/00* (2006.01)
*G06K 9/46* (2006.01)
(Continued)

(52) U.S. Cl.
CPC ..... *G06K 9/00771* (2013.01); *G06K 9/00342* (2013.01); *G06K 9/4652* (2013.01);
(Continued)

(58) Field of Classification Search
CPC .......... G06K 9/00771; G06K 9/00342; G06K 9/4652; G06T 7/215; G06T 2207/20084; G06T 2207/30196; H04N 5/23219
See application file for complete search history.

(56) References Cited

U.S. PATENT DOCUMENTS

2006/0064384 A1    3/2006  Mehrotra et al.
2014/0023248 A1*   1/2014  Yoo .................... G06K 9/00288
                                                        382/118
(Continued)

FOREIGN PATENT DOCUMENTS

CN    102067175 A    5/2011
CN    105354793 A    2/2016
(Continued)

OTHER PUBLICATIONS

International Search Report for PCT/EP2017/078286, dated Jan. 18, 2018.

(Continued)

*Primary Examiner* — David F Dunphy
(74) *Attorney, Agent, or Firm* — Norton Rose Fulbright US LLP; Gerard Messina

(57) ABSTRACT

A camera (1) for monitoring a monitored area (2), including a camera sensor (4) for generating at least one unmasked surveillance image (6) of the monitored area (2) and/or of a subarea of the monitored area (2), the camera sensor (4) being configured for providing raw data, the raw data encompassing the at least one unmasked surveillance image (6), and including an integrated evaluation unit (5), the evaluation unit (5) encompassing an input interface (8) for receiving the raw data and encompassing an output interface (17) for providing output image data.

15 Claims, 2 Drawing Sheets

(51) Int. Cl.
*H04N 5/232* (2006.01)
*G06T 7/215* (2017.01)

(52) U.S. Cl.
CPC ......... *G06T 7/215* (2017.01); *H04N 5/23219* (2013.01); *G06T 2207/20084* (2013.01); *G06T 2207/30196* (2013.01)

(56) References Cited

U.S. PATENT DOCUMENTS

| | | | |
|---|---|---|---|
| 2014/0056518 A1* | 2/2014 | Yano | G06T 7/11 382/173 |
| 2015/0222861 A1* | 8/2015 | Fujii | H04N 5/232945 348/143 |
| 2016/0125246 A1* | 5/2016 | Ryhorchuk | H04N 5/23219 348/143 |
| 2017/0011529 A1* | 1/2017 | Urashita | G06T 5/001 |
| 2017/0208243 A1* | 7/2017 | Masad | G06K 9/3233 |

FOREIGN PATENT DOCUMENTS

| | | |
|---|---|---|
| CN | 105704440 A | 6/2016 |
| DE | 102008007199 A1 | 8/2009 |
| EP | 2429182 A2 | 3/2012 |
| JP | 2005286468 A | 10/2005 |

OTHER PUBLICATIONS

Belbachir A Ed and Belbachir Ahmed A Nabil., "Chapter 16, Smart Cameras for Machine Vision", Jan. 1, 2010, Smart Cam, Springer, New York, NY, pp. 283-303, XP008157219.

\* cited by examiner

CAMERA FOR MONITORING A MONITORED AREA AND MONITORING DEVICE, AND METHOD FOR MONITORING A MONITORED AREA

FIELD OF THE INVENTION

The present invention relates to a camera for monitoring a monitored area, including a camera sensor for generating at least one unmasked surveillance image of the monitored area and/or of a subarea of the monitored area, the camera sensor being configured for providing raw data, the raw data encompassing the at least one unmasked surveillance image. Moreover, the camera encompasses an evaluation unit, the evaluation unit encompassing an input interface for receiving the raw data and an output interface for providing image data. The evaluation unit encompasses a check module and a masking module, the check module being configured for detecting a person in the unmasked surveillance image on the basis of the raw data, the masking module being configured for generating a masked surveillance image, the detected person being represented in a masked manner in the masked surveillance image.

BACKGROUND INFORMATION

Cameras may be utilized for the monitoring of monitored areas. For example, production facilities are monitored, whereby the right of the employees in the production facility to the protection of personal rights may be extremely limited. By comparison, computer vision applications have evolved so far that camera monitoring represents a cost-effective approach to process monitoring.

Video monitoring systems may resort to blocking sensor systems, such as photoelectric barriers and inductive switches, in order to switch off cameras if a person is present in the monitored area.

Publication DE 10 2008 007 199 A1, which may be related art, discusses a masking module for a monitoring system, the monitoring system including at least one monitoring camera and being suitable and/or situated for observing monitored areas encompassing moving objects, including a selection unit for selecting objects as selection objects, the masking module being configured for outputting selection objects or portions thereof in a masked manner.

SUMMARY OF THE INVENTION

Cameras may be utilized for monitoring public and non-public areas, where the safeguarding of personal rights is to be observed.

Within the scope of the present invention, a camera for monitoring a monitored area having the features described herein, a monitoring device having the features described herein, and a method for monitoring a monitored area having the features described herein are described. Advantageous specific embodiments of the present invention result from the further descriptions herein, the following description, and the attached figures.

According to the present invention, a camera for monitoring a monitored area is provided. The camera is, for example, a color camera, a black-and-white camera, an infrared camera, a 3D camera, a PTZ (pan-tilt-zoom) camera, or the like. The camera is, in particular, a video camera and/or a single-shot camera. The camera may be situatable and/or situated in the monitored area. The monitored area is, in particular, an open area or an inner area. Specifically, the monitored area is a plant, a factory, a building, a production facility, a warehouse, a large hall, an airport, a road, and/or a park.

The camera encompasses at least one camera sensor for generating at least one unmasked surveillance image of the monitored area and/or a subarea of the monitored area. The generation of the surveillance image is, in particular, a shot of an image which shows and/or represents the monitored area. The camera sensor encompasses and/or is, in particular, a CCD chip or CMOS chip. The camera sensor may be configured for generating a single image, a few images, and/or a data stream of images, specifically a video sequence, as an unmasked surveillance image. The camera has, in particular, a shooting direction, the camera and the shooting direction being orientable toward the monitored area and/or the subarea. The camera sensor is configured for providing raw data, in particular raw image data. The raw data encompass at least one unmasked surveillance image. In particular, the raw image data encompass the data stream of images. The raw data may encompass additional data, the additional data encompassing, for example, a time stamp and/or sensor data of sensors in the camera. The raw data are, in particular, digital and/or analog data.

The camera encompasses an evaluation unit, the evaluation unit being integrated into the camera. The evaluation unit is configured, in particular, as a piece of hardware and is, for example, a processor, an electronic module, a computer unit, and/or a microcontroller. The evaluation unit encompasses an input interface for receiving the raw data. The input interface may be a cable interface. In particular, the camera sensor encompasses a camera sensor output for providing the raw data, the camera sensor output being exclusively connected to the input interface, for example, with the aid of a cable connection, for the purpose of data transmission. The connection of the camera sensor output and the input interface may be branch-free and/or junction-free, in particular, no further module being situated between the camera sensor output and the input interface.

The integrated evaluation unit encompasses an output interface for providing output image data. The output interface is a cable interface or a radio interface, such as a WLAN interface, an infrared interface, or a Bluetooth interface. The output image data may be digital data; alternatively, the output image data are analog data.

The integrated evaluation unit encompasses a check module. The check module is configured, in particular, as a hardware component and/or a software component in the integrated evaluation unit. The check module is configured for detecting one person, a few persons, and/or all persons in the unmasked surveillance image and/or in the monitored area on the basis of the raw data. At least one person may be located in the unmasked surveillance image and/or in the monitored area; in particular, at least one person may be temporarily located in the monitored area. The check module may be configured for detecting all persons located in the monitored area in the unmasked surveillance image and/or in the unmasked surveillance images.

The test module is configured, in particular, for investigating the raw data based on rules, for example, on predefined parameters and/or characteristics, the parameters being configured for finding persons and/or for differentiating persons and background. The parameters and/or characteristics encompass, for example, shapes, speeds, and/or patterns.

The integrated evaluation unit encompasses a masking module. The masking module is, in particular, a hardware component and/or a software component in the evaluation unit. The masking module is configured for generating a masked surveillance image. Alternatively and/or additionally, the masking module is configured for creating a plurality of masked surveillance images. The person detected in the unmasked surveillance image and/or all persons detected in the unmasked surveillance image is/are represented in a masked manner in the masked surveillance image. For example, the masked surveillance image is the unmasked surveillance image including an additional anonymization of the persons with the aid of masking. The masking may take place with the aid of coverage, distortion, or another camouflage of the person. In particular, for the purpose of anonymization, the entire body of the person is masked; alternatively, only the head and/or eye area of the person are/is masked.

The output image data exclusively encompass masked surveillance images. In particular, the masked surveillance images and/or output image data do not encompass any unmasked surveillance images including persons and/or unmasked persons. The output image data need not encompass any personal information regarding the persons in the unmasked monitored area; in particular, the output image data do not encompass any clearly recognizable faces. Unmasked surveillance images without persons are, in particular, masked surveillance images.

The camera may encompass a camera interface, the camera interface being connected to the output interface for the purpose of data transmission. In particular, the camera interface coincides with the output interface and/or forms the output interface. The output interface may be configured for providing the output image data to a user of the camera. The output image data may encompass, in particular, additional data, such as sensor data of sensors in the camera, time stamps, and/or location information.

One consideration of the present invention is that of providing a cost-effective and reliable camera, with the aid of which monitored areas may be monitored without capturing, providing, and/or storing personal data. The complex checking of an individual case with the aid of extra sensor systems, such as with the aid of motion sensors, becomes superfluous. The software-based protection against attacks by third parties may now also be configured to be simpler, since the camera is configured to be unable to output surveillance images including personal information which may be of interest to third parties. For employees and/or persons in the monitored area, a better real and/or perceived transparency of the anonymization process of the monitoring camera data is achieved.

In a particular embodiment of the present invention, the camera and/or the integrated evaluation unit encompass and/or encompasses a segmentation module. The segmentation module is configured for segmenting the unmasked surveillance image into a person area and a background area based on the raw data. In particular, the segmentation module is configured for segmenting the unmasked image into multiple person areas and background areas, for example, in order to determine multiple person areas for multiple persons in a surveillance image. The multiple person areas and/or background areas may be contiguous and/or fragmented. The person area is, in particular, the area occupied by the person in the unmasked and/or masked surveillance image(s). Alternatively and/or additionally, the person area is the head and/or eye area of the person in the masked and/or unmasked surveillance image. The background area is, in particular, the area in the masked and/or unmasked surveillance image(s), which is free of persons. Segmentation is understood to be, for example, the division, for example, the virtual and/or area-based division, of the unmasked surveillance image into two different areas, namely the person areas and the background areas. The embodiment is based on the consideration of providing a camera which may divide a surveillance image into an area including personal data and an area without personal data, for example, based on a set of rules.

The masking module may be for anonymizing the detected person in the masked surveillance image by colorizing and/or distorting the person area. In particular, the masking module is configured for masking all detected persons by colorizing and/or distorting the person areas. The masked surveillance image may be the unmasked surveillance image including the colorized person area, the background area remaining unchanged. The colorization may take place having a high contrast or a low contrast with respect to the surroundings of the person area.

In one embodiment, the camera, in particular the integrated evaluation unit, encompasses an estimation module. The estimation module is configured for determining an estimated background for the person area, the estimated background may be determined or estimated based on the raw data. Alternatively and/or additionally, the estimated background for the monitored area is fixedly stored in the estimation module. Moreover, it is possible that the estimated background is redetermined at any time with the aid of the estimation module based on further image and/or sensor material. The estimated background is the real background of the relevant area and/or an approach to the area concealed by the person and/or the persons in the unmasked surveillance image. The masking module is configured for masking, in the masked surveillance image, the detected person by filling the person area in the unmasked surveillance image with the estimated background. The person area filled with the estimated background may be framed in the masked surveillance image, the framing in the masked surveillance image making it clear where a masked person is located. This embodiment is based on the consideration of creating masked surveillance images and may include inconspicuous masking for persons and of not losing background information.

It particularly may be provided that the check module, the masking module, the segmentation module, and/or the evaluation unit are/is configured as a neural network. In particular, the neural network is an associative learning network which adapts via feedback on the basis of the offered learning pattern in connection with the expected result. The neural network may act as a non-linear filter, a desirable filter function being obtained by training the network, whereby the available parameters of the network are adjusted. The embodiment is based on the consideration of providing a particularly effective, intelligent, and/or fast option of segmenting, checking, and masking surveillance images.

In one further embodiment of the present invention, the check module, the masking module, the segmentation module, and/or the evaluation unit are/is and/or encompasses/ encompass a field programmable gate array, or FPGA. Alternatively, the check module, the masking module, the segmentation module, and/or the evaluation unit are/is and/ or encompass/encompasses another fixedly programmed and/or configured electronics assembly. In particular, the FGPA encompasses configurable logic elements, the FPGA being configured for implementing combinational logic between various Boolean operations. The advantage of this embodiment is that of obtaining a particularly secure, fast, and attack-proof camera including an integrated evaluation unit.

In particular, it is provided that the detection of the person by the check module is based on fuzzy logic. For example, the check module is configured for applying fuzzy rules for detecting one person and/or multiple persons in the unmasked surveillance images. The embodiment is based on the consideration of providing a camera for anonymization, for which an explicit mathematical model for evaluating the raw data is not required.

In one particular embodiment of the present invention, the check module is configured for carrying out the detection of a person and/or all persons in the monitored area and/or in the unmasked surveillance image on the basis of a detected motion. The motion detection takes place, for example, by evaluating at least two surveillance images of an overlapping and/or identical subarea recorded at different times. Alternatively and/or additionally, the motion detection takes place on the basis of sensor data of sensors integrated in the camera and directed toward the subarea. The check module may be configured for tracking a person based on the detected motion, areas in the masked monitored area, to which the person will presumably move, being represented in a masked manner, for example. The embodiment is based on the consideration of achieving a simple way to carry out detection and achieving a secure masking of persons and reducing the risk of unmasked person areas with greater certainty, for example, with the aid of directed expanded masking.

It particularly may be provided that the camera and/or the integrated evaluation unit encompass/encompasses a blocking module. The blocking module is configured as hardware and/or software. The blocking module is situated between the masking module and the output interface with respect to data transmission and is connected to the masking module and the output interface for the purpose of data transmission. The blocking module is configured for blocking and/or preventing a transfer of raw data and/or a transfer of unmasked surveillance images to the output image data. For example, the blocking module is configured for investigating the masked surveillance images with respect to persons and/or personal data. In particular, the blocking module is configured for blocking and/or aborting the output of output image data upon detection of persons and/or personal data in the masked surveillance images. The embodiment is based on the consideration of providing a camera which particularly reliably prevents the output of surveillance images including personal data.

In one further embodiment of the present invention, the blocking module is for preventing a data flow from the output interface in the direction of the masking module and/or the camera sensor. For example, the blocking module is a data connection which permits a data flow exclusively from the masking module to the output interface. In particular, the blocking module is configured for preventing attacks from the outside and/or attempts to disable the masking module and/or attempts to tap unmasked surveillance images. The embodiment is based on the consideration of providing a security step for the camera so that no unmasked surveillance images are tappable.

It particularly may be provided that the camera sensor and the evaluation unit are situated in a shared housing. In particular, a plurality of camera sensors is situatable in the shared housing, the plurality of camera sensors being connected to the evaluation unit. Further sensors, such as motion sensors, are situatable in the housing, for example, the sensors providing sensor data which may be portions of the raw data. The camera and/or the housing may be made apparent from the outside in an optical, for example, color-based manner, so that persons in the monitored area recognize the camera as a masking camera. This embodiment is based on the consideration of providing a one-piece camera and/or device which records anonymized and marked surveillance images of a monitored area.

A further object of the present invention is a monitoring device for monitoring a monitored area, including a plurality of cameras, the cameras encompassing a camera sensor for generating at least one unmasked surveillance image of the monitored area and/or a subarea of the monitored area, the camera sensor being configured for providing raw data, the raw data encompassing the at least one unmasked surveillance image, including an integrated evaluation unit, the evaluation unit encompassing an input interface for receiving the raw data and an output interface for providing output image data, the evaluation unit encompassing a check module and a masking module, the check module being configured for detecting a person in the unmasked surveillance image on the basis of the raw data, the masking module being configured for generating a masked surveillance image, the detected person being represented in a masked manner in the masked surveillance image, the output image data exclusively encompassing masked surveillance images. The monitoring device is configured, in particular, for monitoring public areas, such as parks or roads, or non-public areas, such as factories.

Further features, advantages, and effects of the present invention result from the following description of an exemplary embodiment of the present invention and from the attached figures.

DETAILED DESCRIPTION

Figure 1:
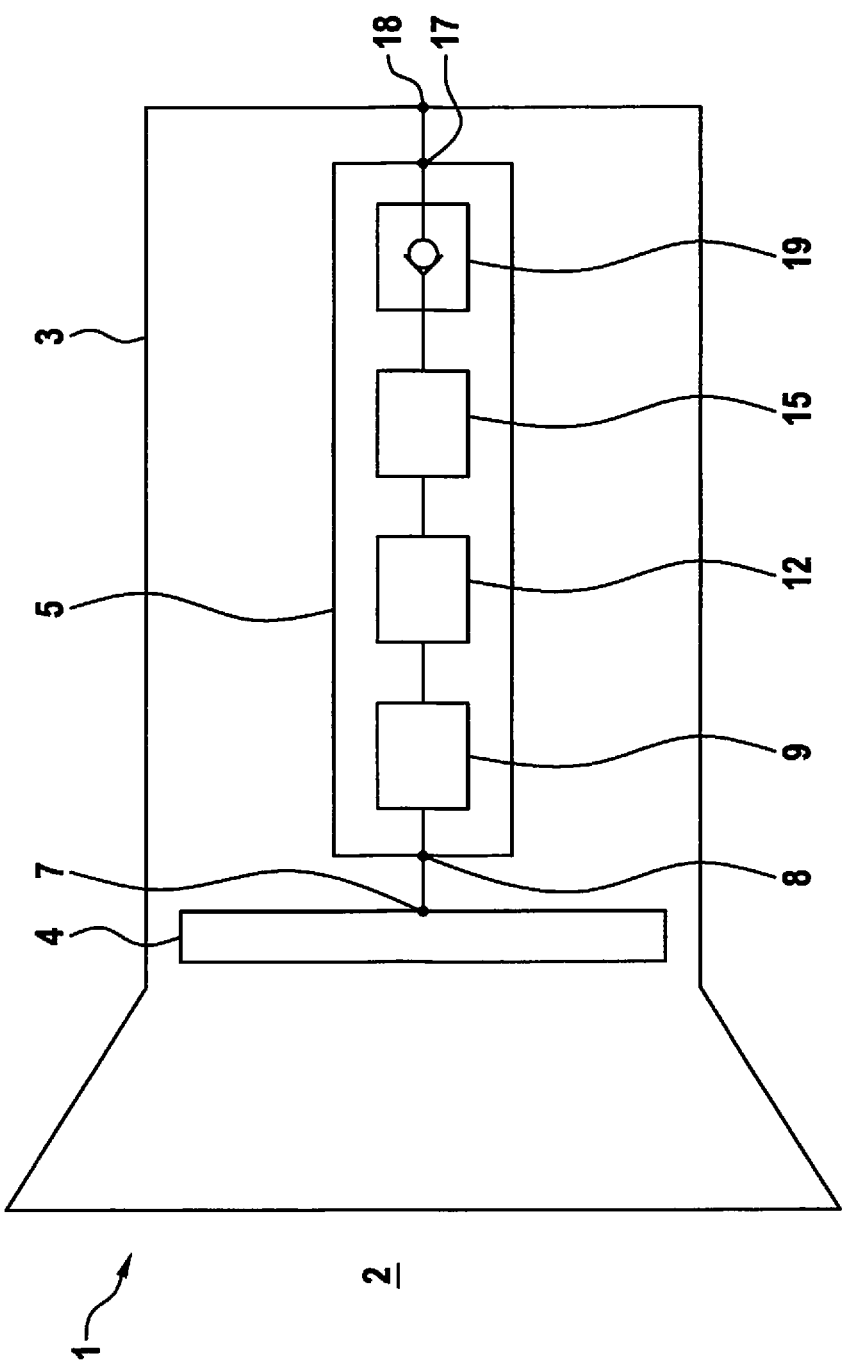
FIG. 1 shows a schematic view of a camera.

FIG. 1 shows a schematic view of a camera 1. Camera 1 is a color camera and is configured for the video monitoring of a monitored area 2. Monitored area 2 is a building area in this case, such as a production line in a factory. Camera 1 includes a housing 3. Housing 3 forms an encapsulation of the camera components with respect to the surroundings. Housing 3 may include fasteners for fastening camera 1 in monitored area 2.

A camera sensor 4 and an integrated evaluation unit 5 are situated in housing 3. Camera sensor 4 is a light-sensitive, pixelated semiconductor chip which points with the shooting direction toward monitored area 2. Camera sensor 4 is configured for recording unmasked surveillance images 6 (FIG. 2) of monitored area 2. Camera sensor 4 includes a camera sensor output 7 as a data interface, camera sensor output 7 being configured for providing raw data, raw data encompassing unmasked surveillance image 6.

Integrated evaluation unit 5 is, for example, an electronic module and includes an input interface 8 which is connected to camera sensor output 7, for example, with the aid of a hard-wired line, for the purpose of data transmission. In this way, the raw data and unmasked surveillance image 6 are provided to input interface 8.

Integrated evaluation unit 5 includes a check module 9. Check module 9 is connected to input interface 8 for the purpose of data transmission and, in this way, receives the raw data. Check module 9 is configured for checking the raw data and/or unmasked surveillance images 6 for persons 10 (FIG. 2) and for detecting found persons 10 as such. Check module 9 analyzes unmasked surveillance images 6 for certain characteristics and evaluates, based on a set of rules, whether something is a person 10 or an object 11 (FIG. 2).

Figure 2:
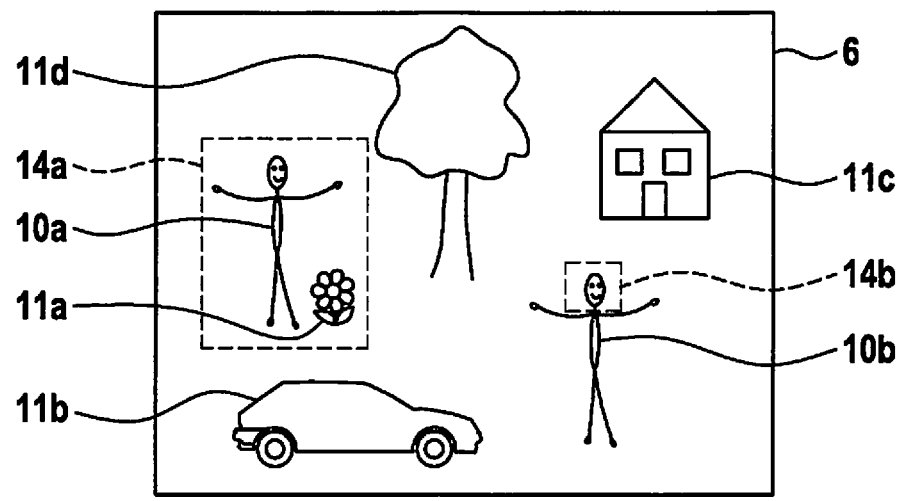
FIG. 2 shows an unmasked surveillance image.

Integrated evaluation unit 5 encompasses a segmentation module 12 which is configured for dividing unmasked surveillance image 6 into a background area and a person area 14 (FIG. 2). In this case, with the aid of segmentation module 12, areas in unmasked surveillance image 6 which encompass a person 10 are defined as a person area 14 and, for example, are represented as a completely covering rectangle or as a surrounding area. Areas without persons 10 are established by segmentation module 12 as the background area.

Integrated evaluation unit 5 encompasses a masking module 15. Masking module 15 is configured for creating a masked surveillance image 16, masked surveillance image 16 corresponding to unmasked surveillance image 6 including person areas 14 which have been filled with color or provided with a colored background. Person areas 14 provided with a colored background anonymize persons 10, so that no personal information is contained in masked surveillance image 16. Masking module 15 is connected to an output interface 17 of integrated evaluation unit 5 for the purpose of data transmission, output image data being provided to output interface 17 by masking module 15. The output image data encompass masked surveillance image 16. Unmasked surveillance images 6 without persons 10 and/or without personal information are general masked surveillance images 16.

Camera housing 3 includes a camera interface 18, the output image data being provided to a user with the aid of camera interface 18.

A blocking module 19 is situated on the data connection between output interface 17 and masking module 15. Blocking module 19 is configured for fending off hacker attacks from the outside. Blocking module 19 is configured for preventing a data flow from output interface 17 to masking module 15, so that masking module 15, for example, may not be disabled and/or so that unmasked surveillance images 6 may not be tapped.

FIG. 2 schematically shows an unmasked surveillance image 6. Unmasked surveillance image 6 includes a plurality of objects 11a, 11b and 11c and two persons 10a and 10b. Check module 9 is configured for recognizing persons 10a and 10b as persons and differentiating them from objects 11a, 11b and 11c.

Segmentation module 12 has divided unmasked surveillance image 6 into a background area and two person areas 14a and 14b. Person area 14a is generated by segmentation module 12 by circumscribing detected person 10a with a rectangle, so that entire person 10a is covered by person area 14a. Person area 14b is generated by segmentation module 12 by circumscribing the head of detected person 10b with a rectangle, so that only the head of person 10b is covered by person area 14b.

Figure 3:
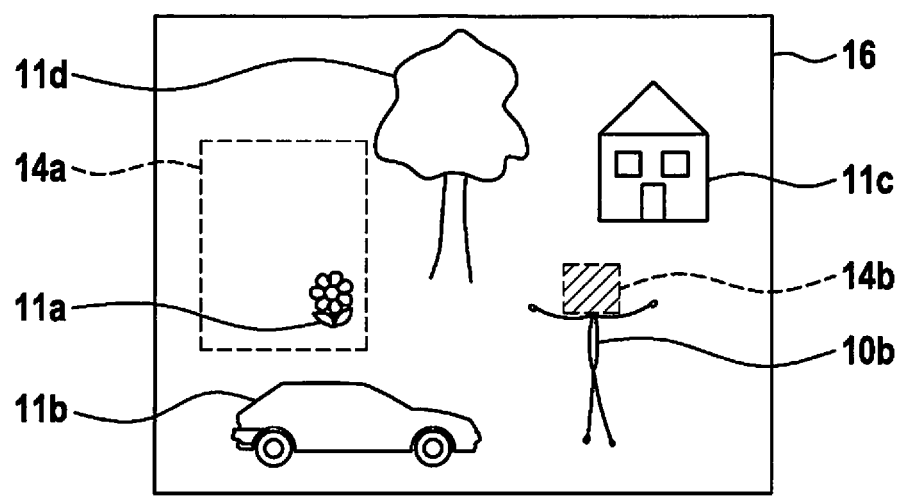
FIG. 3 shows a masked surveillance image.

FIG. 3 shows masked surveillance image 16 based on unmasked surveillance image 6. Masked surveillance image 16 shows objects 11a, 11b, 11c and 11d from unmasked surveillance image 6. Masked surveillance image 16 does not show person 10a from unmasked surveillance image 6. Masked surveillance image 16 also does not show the head of person 10b from unmasked surveillance image 6.

Integrated evaluation unit 5 of camera 1 includes an estimation module. The estimation module is configured for estimating a background for person area 14a based on unmasked surveillance image 6 and/or other images of monitored area 2. The background is, in particular, the area of monitored area, which is concealed in unmasked surveillance image 6 by person 10a. The background for person area 14a is object 11a in this case. Masking module 15 is configured for representing person area 14a in masked surveillance image 16 filled with the background. Person 10 is therefore represented in a masked manner and is anonymized. Masked person area 14b shows one further type of masking. Masking module 15 is configured, in this case, for representing person area 14b in the form of a colored filling. The head of person 10b is no longer recognizable due to the colored filling in the masked surveillance image and, in this way, person 10b is anonymized.

What is claimed is:

1. A camera for monitoring a monitored area, comprising:
a camera sensor for generating at least one unmasked surveillance image of the monitored area and/or of a subarea of the monitored area, the camera sensor being configured for providing raw data, the raw data encompassing the at least one unmasked surveillance image; and
an evaluation unit, the evaluation unit encompassing an input interface for receiving the raw data and an output interface for providing output image data;
wherein:
the evaluation unit includes a check module, a masking module, and a blocking module;
the check module is configured to detect a person in the unmasked surveillance image on the basis of the raw data;
the masking module is configured to generate a masked surveillance image, the detected person being represented in a masked manner in the masked surveillance image;
the evaluation unit is integrated into the camera;
the output image data exclusively encompasses masked surveillance images; and
the blocking module:
(1) is configured to ensure that the output image data exclusively encompasses the masked surveillance images by detecting a person in the image data being provided towards the output interface and, in response to the detection of the person by the blocking module, blocking output of the image data in which the blocking module has detected the person; and/or
(2) is configured to prevent a data flow in a direction into the evaluation unit via the output interface; and/or
(3) is situated between the masking module and the output interface with respect to data transmission for blocking and/or for preventing a transfer of raw data and/or a transfer of unmasked surveillance images to the output image data.

2. The camera of claim 1, further comprising:
a segmentation module for segmenting the unmasked surveillance image into a person area and a background area based on the raw data.

3. The camera of claim 2, wherein the masking module is for anonymizing the detected person in the masked surveillance image by colorizing the person area in the unmasked surveillance image.

4. The camera of claim 2, further comprising:
an estimation module for determining an estimated background for the person area, wherein the masking module is for masking the detected person in the masked surveillance image by filling the person area in the unmasked surveillance image with the estimated background.

5. The camera of claim 1, wherein the check module, the masking module, the estimation module and/or the integrated evaluation unit are configured as a neural network.

6. The camera of claim 1, wherein the check module, the masking module, the estimation module and/or the integrated evaluation unit are configured as a field programmable gate array.

7. The camera of claim 1, wherein the detection of the person by the check module is based on a motion detection.

8. The camera of claim 1, wherein the blocking module is situated between the masking module and the output interface with respect to data transmission, for blocking and/or for preventing the transfer of raw data and/or the transfer of the unmasked surveillance images to the output image data.

9. The camera of claim 8, wherein the blocking module is for preventing a data flow from the output interface towards the masking module and/or the camera sensor.

10. The camera of claim 1, wherein the camera sensor and the evaluation unit are situated in a shared housing.

11. The camera of claim 1, wherein the blocking module is configured to ensure that the output image data exclusively encompasses the masked surveillance images by detecting the person in the image data being provided towards the output interface and, in response to the detection of the person by the blocking module, blocking output of the image data in which the blocking module has detected the person.

12. The camera of claim 1, wherein the blocking module is configured to prevent the data flow in the direction into the evaluation unit via the output interface.

13. A camera for monitoring a monitored area, comprising:
a camera sensor for generating at least one unmasked surveillance image of the monitored area and/or of a subarea of the monitored area, the camera sensor being configured for providing raw data, the raw data encompassing the at least one unmasked surveillance image;
at least one processor integrated into the camera;
an input interface via which the at least one processor can receive the raw data; and
an output interface;
wherein the at least one processor is configured to:
detect a person in the unmasked surveillance image based on the raw data using a fuzzy logic;
generate a masked surveillance image in which the detected person is represented in a masked manner; and
output the masked surveillance image as output image data via the output interface.

14. A monitoring device for monitoring a monitored area, comprising:
a plurality of cameras;
wherein each of the cameras includes:
a camera sensor for generating at least one unmasked surveillance image of the monitored area and/or of a subarea of the monitored area, the camera sensor being configured for providing raw data, the raw data encompassing the at least one unmasked surveillance image; and
an evaluation unit, the evaluation unit encompassing an input interface for receiving the raw data and an output interface for providing output image data;
wherein:
the evaluation unit includes a check module, a masking module, and a blocking module;
the check module is configured to detect a person in the unmasked surveillance image on the basis of the raw data;
the masking module is configured to generate a masked surveillance image, the detected person being represented in a masked manner in the masked surveillance image;
the evaluation unit is integrated into the camera;
the output image data exclusively encompasses masked surveillance images; and
the blocking module:
(1) is configured to ensure that the output image data exclusively encompasses the masked surveillance images by detecting a person in the image data being provided towards the output interface and, in response to the detection of the person by the blocking module, blocking output of the image data in which the blocking module has detected the person; and/or
(2) is configured to prevent a data flow in a direction into the evaluation unit via the output interface; and/or
(3) is situated between the masking module and the output interface with respect to data transmission for blocking and/or for preventing a transfer of raw data and/or a transfer of unmasked surveillance images to the output image data.

15. A method for monitoring a monitored area, the method comprising:
generating at least one unmasked surveillance image of the monitored area and/or of a subarea of the monitored area with the aid of a camera sensor;
providing raw data with the camera sensor, the raw data encompassing the at least one unmasked surveillance image;
providing an evaluation unit, the evaluation unit encompassing an input interface for receiving the raw data and an output interface for providing output image data, the evaluation unit encompassing a check module, a masking module, and blocking module;
detecting a person in the unmasked surveillance image based on the raw data with the check module;
generating a masked surveillance image with the masking module, the detected person being represented in a masked manner in the masked surveillance image;
providing output image data which exclusively encompasses masked surveillance images with the evaluation unit, wherein the evaluation unit is integrated into the camera; and
the blocking module:
(1) ensuring that the output image data exclusively encompasses the masked surveillance images by detecting a person in the image data being provided towards the output interface and, in response to the detection of the person by the blocking module, blocking output of the image data in which the blocking module has detected the person; and/or
(2) preventing a data flow in a direction into the evaluation unit via the output interface; and/or
(3) blocking and/or for preventing a transfer of raw data and/or a transfer of unmasked surveillance images to the output image data, with the blocking module being situated between the masking module and the output interface with respect to data transmission for.

\* \* \* \* \*